United States Patent
Uematsu et al.

(10) Patent No.: US 6,512,351 B2
(45) Date of Patent: Jan. 28, 2003

(54) POWER SUPPLY CIRCUIT OF MOBILE UNIT SUPPLIED WITH POWER WITHOUT CONTACT, AND MOBILE UNIT

(75) Inventors: Tatsuya Uematsu, Kariya (JP); Isao Watanabe, Kariya (JP); Tadashi Kondo, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/010,322

(22) Filed: Nov. 8, 2001

(65) Prior Publication Data

US 2002/0093310 A1 Jul. 18, 2002

(30) Foreign Application Priority Data

Nov. 16, 2000 (JP) ........................ 2000-349809

(51) Int. Cl.[7] ................................. H02J 7/00
(52) U.S. Cl. ........................ 320/166; 307/66
(58) Field of Search ................. 320/166, 109; 307/66, 104, 84, 87, 9.1, 10.1

(56) References Cited

U.S. PATENT DOCUMENTS 4,728,808 A * 3/1988 Bet-Esh et al. .............. 307/66
5,560,218 A * 10/1996 Jang ........................... 323/906
5,650,923 A * 7/1997 Suzuki et al. ................ 363/126
5,889,661 A * 3/1999 Tamura et al. ................ 363/37
5,901,057 A * 5/1999 Brand et al. .................. 307/66

FOREIGN PATENT DOCUMENTS

| JP | U-62-101391 | 6/1987 |
| JP | A-08-98438 | 4/1996 |
| JP | A-10-257691 | 9/1998 |
| JP | A-11-318073 | 11/1999 |

* cited by examiner

*Primary Examiner*—Edward H. Tso
*Assistant Examiner*—Pia Tibbits
(74) *Attorney, Agent, or Firm*—Woodcock Washburn LLP

(57) ABSTRACT

When a mobile unit moves with a motor driven by electric power supplied by a power supply line without a contact when the mobile unit moves where the power supply line exists. The electric power supplied without a contact is also used in charging a electric double layer capacitor. Since the charging current is limited by limiting resistance, the motor can be supplied with sufficient power although the electric double layer capacitor is in a vacant (completely discharged) state.

5 Claims, 2 Drawing Sheets

POWER SUPPLY CIRCUIT OF MOBILE UNIT SUPPLIED WITH POWER WITHOUT CONTACT, AND MOBILE UNIT

BACKGROUND OF THE INVENTION

1. Field of the Invention

The present invention relates to a power supply circuit of a mobile unit, and a mobile unit which moves by a non-contact power supply.

2. Description of the Related Art

Conventionally, a carriage system using a mobile unit (cart, etc.) having the function of carrying appliances, parts, etc. have been provided in the facilities of a factory, etc. The carriage system can typically be a mobile unit which has wheels and autonomously moves by a motor, etc. along rails fixed on the site. The system is not limited to this application. For example, it can be provided with a carriage cart lifted by magnetism, etc. In any case, with the configuration in which a mobile unit itself requires electric power, the conventional mobile unit is loaded with a battery.

However, it is necessary to load a large battery to operate such a mobile unit loaded with a battery continuously for a long time. In addition, the continuous operation is limited because the battery has to be periodically charged or replaced.

On the other hand, there is a method of supplying electric power to a mobile unit (cart) not by a loaded battery but by an induction line provided along the rails for a high frequency sine wave current, and high frequency power induced by a 'coil having an iron core' provided for the cart facing the induction line with a gap of several millimeters.

However, for example, when power is supplied by a plurality of high frequency power sources to a long distance rails or loop-shaped rails in this method, the induction line cannot be mounted without discontinuing the power supply. Therefore, power cannot be supplied to the cart running along the rails at some sections.

On the other hand, for example, Japanese Patent Publication No.8-98438 has suggested the following method. That is, with the configuration in which power is supplied through the above mentioned induction line, a cart is loaded with a cart battery 6 (lead storage battery) such that the battery can be charged while the cart is running, and the cart can continue running by the battery at the sections where the above mentioned induction line cannot supply electric power to the cart.

However, the method according to the above mentioned Japanese Patent Publication No.8-98438 has the following problems.

(1) Since the battery is limited in the number of repetitions of charge/discharge, it has to be periodically replaced (for example, every year or every second year).

(2) Since relatively a long time is required to charge the battery, the capacity of the battery is reduced when the cart frequently passes the no power supply sections.

(3) Since the battery is poor at a low temperature, it cannot be used outdoors or in a freezer.

(4) Since the battery has strong internal resistance, it cannot be quickly discharged, thereby failing in obtaining strong momentary power required to start or accelerate the cart.

(5) In the circuit according to Japanese Patent Publication No.8-98438, if the battery is in the discharged state, then electric power is supplied by high frequency induction first to charge the battery. Therefore, the cart cannot be immediately started.

SUMMARY OF THE INVENTION

The present invention aims at providing a power supply circuit capable of simultaneously supplying power to a driving device and charging a battery in a mobile unit to which power can be supplied without a contact, and allowing the mobile unit to move in any state without problems.

The power supply circuit according to the present invention is used for a mobile unit supplied with electric power through a power supply line mounted along the rails of the mobile unit without a contact. The circuit includes a chargeable/dischargeable battery, and a power supply/ charge/discharge circuit for supplying the power obtained without a contact to the driving device and simultaneously distributing a part of the power to charge the battery when the power is supplied through the power supply line, and supplying the power from the battery to the driving device when the power is not supplied through the power supply line.

Using a charge/discharge battery, the power supply circuit with the above mentioned configuration can operate the mobile unit using the battery even at the sections having no power supply lines (no power supply sections). Furthermore, the circuit charges the battery at a section where a power supply line is provided, but with only a part of the supplied power used to charge the battery, thereby preventing the charging current from excessively flowing to the battery (that is, stopping the mobile unit) to incur the shortage of power to be provided for the driving device.

For example, by providing a limiting resistance for limiting the charging current to the battery, the mobile unit can keep (start) its operation although the battery is almost vacant (completely discharged).

Furthermore, if a DC-DC converter is provided at a stage subsequent to the supply/charge/discharge circuit, the value of the limiting resistance can be set such that it cannot be lower than the minimum input voltage of the DCDC converter by applying a voltage to both ends of the limiting resistance regardless of the state of the battery.

Thus, by setting an appropriate resistance value of the limiting resistance, the lower limit of the input voltage of the DC-DC converter can be maintained although the battery becomes almost vacant (completely discharged) and the voltage exceedingly drops, thereby suppressing any problems when electric power is supplied to the driving device through the DC-DC converter.

Furthermore, for example, since the battery can be quickly charged by using an electric double layer capacitor as the battery, the following effects can be obtained.

There are no problems occurring when a mobile unit frequently passes a no power supply section.

Since a battery can be quickly discharged, strong momentary power required to start or accelerate can be obtained.

A large capacity enables a cart to move without a power supply for a relatively long time The present invention can also be configured as a mobile unit provided with the above mentioned power supply circuit.

DESCRIPTION OF THE PREFERRED EMBODIMENT

An embodiment of the present invention is described below by referring to the attached drawings.

Figure 1:
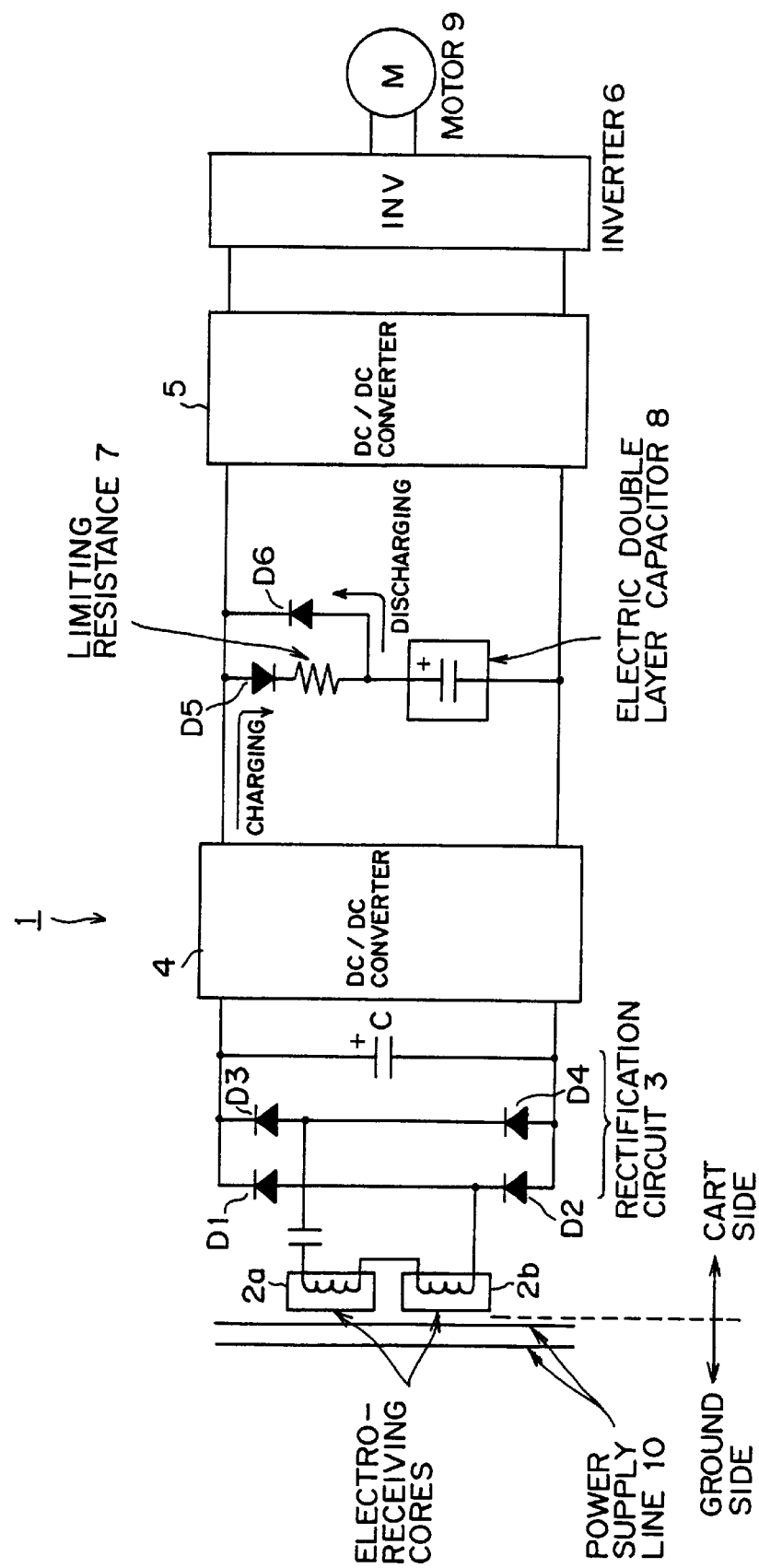
FIG. 1 shows an example of the configuration of the power supply circuit loaded into a mobile unit.

FIG. 1 shows an example of the configuration of the power supply circuit loaded into the mobile unit according to an embodiment of the present invention.

In FIG. 1, a power supply line 10 is provided along the rails of a mobile unit similarly as the above mentioned induction line, and a high frequency sine wave current flows through the line.

The mobile unit (hereinafter a carriage cart) is provided with a power supply circuit 1 comprising electro-receiving cores 2a and 2b, a rectification circuit 3, a DC/DC converter 4, a DC/DC converter 5, an inverter 6, diodes D5 and D6, a limiting resistance 7, and a electric double layer capacitor 8. The power supply circuit 1 supplies electric power to a motor 9, the motor 9 is driven, and the carriage cart moves. For example, wheels are provided for the carriage cart, and rails are fixed as the path of the carriage cart which runs along the rails.

Since the motor 9 is not limited to the AC motor, and the configuration of the power supply circuit is not limited to the example shown in FIG. 1.

In FIG. 1, the electro-receiving cores 2a and 2b are formed by winding continuous rings around a magnetic object such as an iron core, etc., and arranged in any position on the carriage cart such that the cores face the power supply line 10 with a space of predetermined value between the cores and the power supply line 10 (for example, several mm (millimeter). In FIG. 1, two electro-receiving cores are connected in series (to increase dielectric power) . However, the configuration is not limited to this application. For example, there can be a single electro-receiving core.

As described above, a high frequency current flows through the power supply line 10, and electromagnetically induced by the coils of the electro-receiving cores 2a and 2b, thereby providing a high frequency current for the power supply circuit 1 without a contact. The high frequency current provided through the electro-receiving cores 2a and 2b is converted by the rectification circuit 3 into a direct current. The rectification circuit 3 comprises, for example, diodes D1, D2, D3, and D4, and a capacitor C, performs an AC-DC conversion, and is referred to also as a converter. The rectification circuit has a configuration including a diode or a thyristor.

The output voltage from the rectification circuit 3 is converted by the DC/DC converter 4 into the charging voltage of the electric double layer capacitor 8.

The characteristic of the power supply circuit according to the present embodiment resides in the circuit (referred to as a power supply/charge/discharge circuit) comprising the diodes D5 and D6, the limiting resistance 7, and the electric double layer capacitor 8.

That is, for example, when the electric double layer capacitor 8 is in the vacant (completely discharged) state, and when there is no limiting resistance 7, the power (current) output from the DC/DC converter 4 is consumed first to charge the electric double layer capacitor 8. Therefore, the power required to drive the motor 9 is not supplied to the DC/DC converter 5, thereby failing to start the carriage cart (the motor 9 is an example of a driving device for autonomously moving the carriage cart).

Furthermore, the DC/DC converter 5 has the lower limit (minimum input voltage). If there is no limiting resistance 7, the voltage value appearing on both ends of the electric double layer capacitor 8 is considerably smaller than the value in the fully charged state if the electric double layer capacitor 8 is in the vacant (completely discharged) state although the voltage on both ends of the electric double layer capacitor 8 exceeds the lower limit in the fully charged state of the electric double layer capacitor 8. As a result, the voltage value becomes smaller than the lower limit.

According to the present embodiment, by providing the limiting resistance 7 (resistance for limiting charging current), the charging current provided for the electric double layer capacitor 8 through the diode D5 can be reduced, and a voltage exceeding the minimum input voltage of the DC/DC converter 5 can be constantly applied in any state of the electric double layer capacitor 8. That is, the voltage input into the DC/DC converter 5 is the 'voltage of the electric double layer capacitor 8+voltage applied to the limiting resistance 7'. Therefore, the resistance value of the limiting resistance 7 is set such that it can be larger than the above mentioned lower limit although the electric double layer capacitor 8 is in the vacant (completely discharged) state.

In the explanation above, the electric double layer capacitor 8 is in the vacant state (completely discharged). However, the present invention is not limited to this application, and it holds true when the capacitor is in the half discharged state (when the voltage drops and needs charging).

Thus, with the circuit shown in FIG. 1, the case in which most electric power output from the DC/DC converter 4 is used to charge the electric double layer capacitor 8 can be avoided although the electric double layer capacitor 8 is in the vacant (completely discharged) state. Furthermore, the minimum input voltage of the DC/DC converter 5 cannot be lowered. Therefore, the cart can be immediately started. That is, in any state, the capacitor can be charged, and simultaneously the motor 9 can be supplied with sufficient electric power.

In the explanation above, an electric double layer capacitor is used. However, the present invention is not limited to this application, but any other capacitors that can successfully drive the motor 9 can be adopted. Additionally, various secondary batteries can be used. According to the present invention, these batteries are referred to as '(repeatedly) chargeable/dischargeable batteries'.

However, when an electric double layer capacitor is used, the following merits can be obtained.

(1) Since the number of repetitions of charge/discharge is not limited, periodical replacement is not required.

(2) Since the capacitor can be quickly charged, there is no problem with the cart frequently passing no power supply sections.

(3) Since it successfully works at a low temperature, it can be used outdoors and in a freezer.

(4) Since it can be quickly charged, strong momentary power required to start or accelerate a cart can be obtained.

(5) Since it is characterized by high-power-density/small-and-high-energy-density, and has a large capacity, it moves for relatively a long time at a no power supply section.

(6) No problems occur when the capacitor is completely discharged, and it can be repeatedly charged.

Through a circuit comprising the above mentioned diodes D5 and D6, the limiting resistance 7, and the electric double layer capacitor 8, the power input into the DC/DC converter 5 is converted by the DC/DC converter 5 into the input voltage of the inverter 6. The DC/DC converter 5 has the function corresponding to the load fluctuation (load fluctuation of the motor 9).

The inverter 6 is a circuit for DC-AC converting (reverse converting) a direct current into an alternate current having an arbitrary frequency/voltage, and converts the direct power output by the DC/DC converter 5 into the alternate power having the frequency/voltage driving the motor 9. At the section where power is supplied through the power supply line 10, power is supplied to the motor 9 as described above, and the carriage cart can be successfully moved.

As mentioned above, when a cart is running through power supply sections (where the power supply line 10 is mounted along the rails and power can be provided), the supplied power drives the motor 9, and the electric double layer capacitor 8 can be charged.

Figure 2:
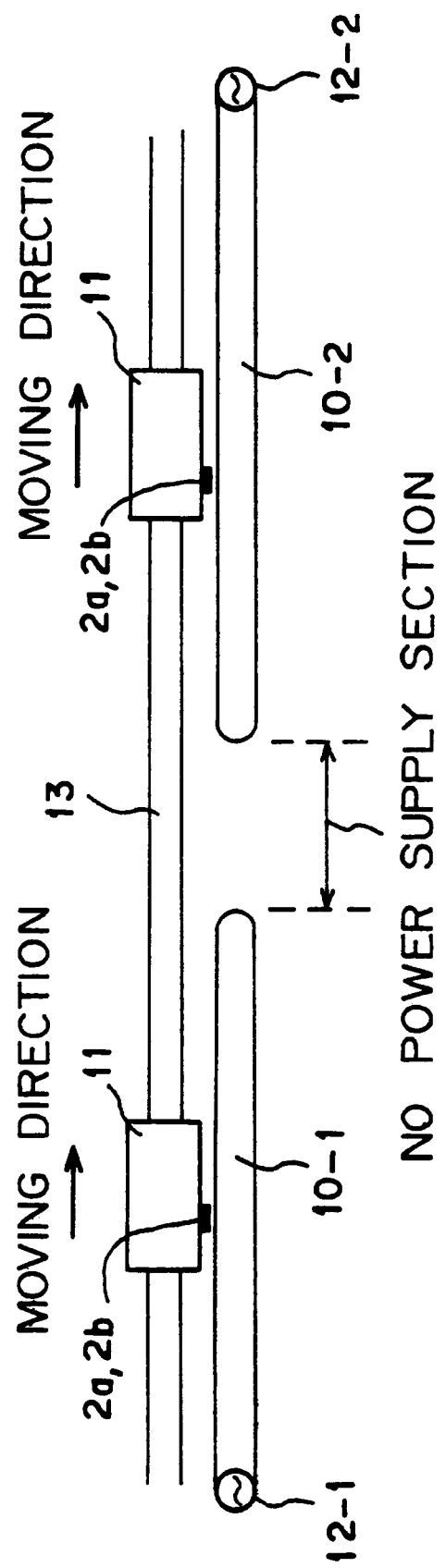
FIG. 2 shows an example of a carriage system using a mobile unit, especially at a no power supply section.

On the other hand, since the length of the power supply line 10 supported by one power source is limited, a carriage cart 11 runs through a section (no power supply section) where a power supply from the power supply line 10 is stopped when the carriage cart 11 is running along the rails (rails 13 shown in FIG. 2), and moving from a power supply line 10-1 by a power source 12-1 to a power supply line 10-2 by another power source 12-2, for example, as shown in FIG. 2 (FIG. 2 shows an example of a no power supply section in a carriage system using a mobile unit). Without limiting to this case, for example, if it is necessary to obtain a passage of a person who works on the site, if a station is provided for temporarily storing a cart, or in other various cases, a no power supply section exists.

While the carriage cart 11 is running at such a no power supply section, power is supplied to the motor 9 by the discharge of the electric double layer capacitor 8. That is, if the power supply from the power supply line 10 is stopped, then the electric double layer capacitor 8 starts discharging, and power is supplied to the DC/DC converter 5 through the diode D6. The terminal voltage of the electric double layer capacitor 8 is designed not to be lower than the lower limit of the input voltage of the DC/DC converter 5 (although it is continuously discharged when and after it is fully charged). Therefore, the electric double layer capacitor 8 can be configured as necessary such that a plurality of electric double layer capacitors are connected in series.

The cart cannot only be moved using wheels but also can be a carriage cart lifted by magnetism disclosed by, for example, Japanese Patent Publication 8-98438. In this case, the motor 9 can be a linear motor. Otherwise, any configuration can be accepted only if a mobile unit can be moved with a constant distance maintaining between the mobile unit and the power supply line 10 (especially the constant distance between the electro-receiving cores 2a and 2b and the power supply line 10).

Furthermore, the above mentioned carriage system using the mobile unit can be used in the equipment of a factory, etc., and outdoors.

As described above in detail, according to the power supply circuit of a mobile unit to which power can be supplied without a contact, a battery can be charged regardless of the state of the battery, and a mobile unit can continue running. In addition, using a electric double layer capacitor as a battery, a cart can continue running without any problem although the cart frequently passes a no power supply period or along a long no power supply period. Therefore, various merits can be obtained by the present invention.

What is claimed is:

1. A power supply circuit of a mobile unit supplied with electric power through a power supply line mounted along rails of the mobile unit without a contact, comprising:

a chargeable/dischargeable battery; and a power supply/charge/discharge circuit supplying the power obtained without a contact to a driving device and simultaneously distributing a part of the power to charge said battery when the power is supplied through the power supply line, and supplying the power from said battery to the driving device when the power is not supplied through the power supply line.

2. The circuit according to claim 1, wherein said power supply/charge/discharge circuit comprises a limiting resistance for limiting a charging current to said battery.

3. The circuit according to claim 2, further comprising a DC/DC converter at a stage subsequent to said power supply/charge/discharge circuit, wherein a value of the limiting resistance can be set such that the value cannot be lower than a minimum input voltage of said DC-DC converter by applying a voltage to both ends of the limiting resistance regardless of a state of said battery.

4. The circuit according to claim 1, wherein said battery is an electric double layer capacitor.

5. A mobile unit moving by power supplied through a power supply line provided along rails without a contact, comprising:

a driving unit moving said mobile unit; and a power supply circuit comprising a chargeable/dischargeable battery, and supplying the power obtained without a contact to a driving device and simultaneously distributing a part of the power to charge said battery when the power is supplied through the power supply line, and supplying the power from said battery to the driving device when the power is not supplied through the power supply line.

* * * * *